Feb. 6, 1951 W. A. PIPKIN 2,540,345
METHOD OF AND APPARATUS FOR EXTRACTING JUICE
FROM WHOLE CITRUS FRUIT AND EXCLUDING
ATMOSPHERE FROM CONTACT THEREWITH
Filed July 3, 1944 5 Sheets-Sheet 1

INVENTOR:
WILBUR A. PIPKIN
BY
ATTORNEY

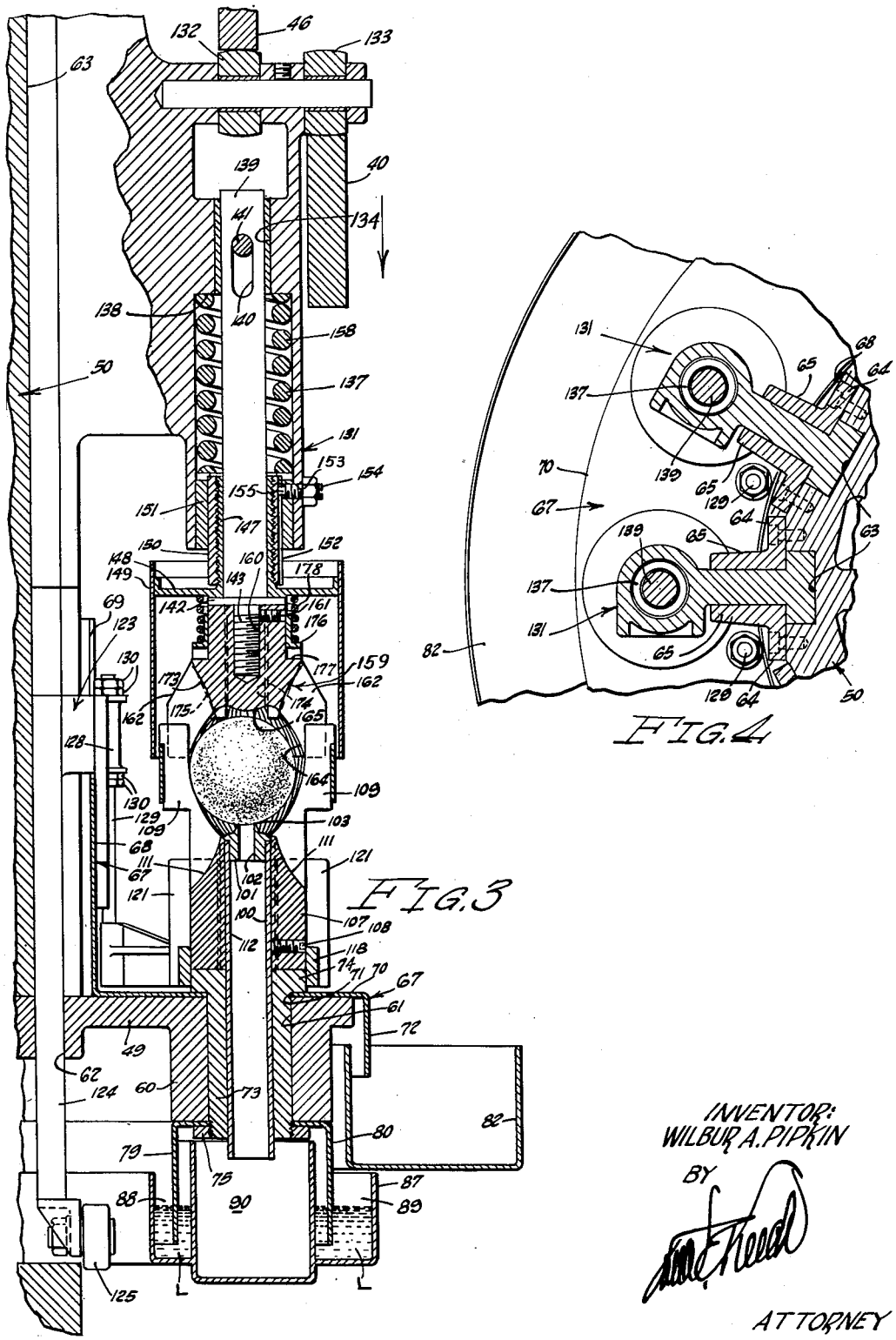

Feb. 6, 1951     W. A. PIPKIN     2,540,345
METHOD OF AND APPARATUS FOR EXTRACTING JUICE
FROM WHOLE CITRUS FRUIT AND EXCLUDING
ATMOSPHERE FROM CONTACT THEREWITH
Filed July 3, 1944     5 Sheets-Sheet 4
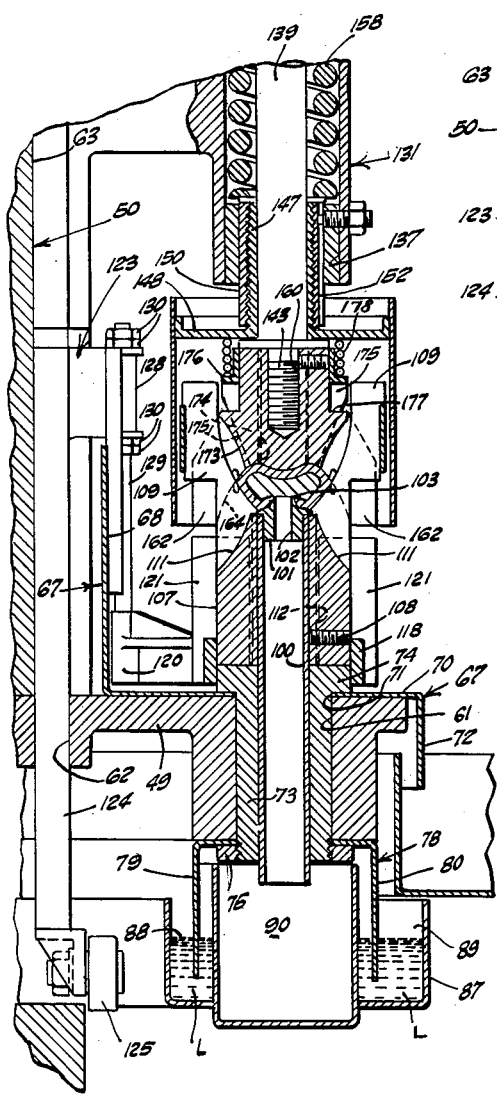
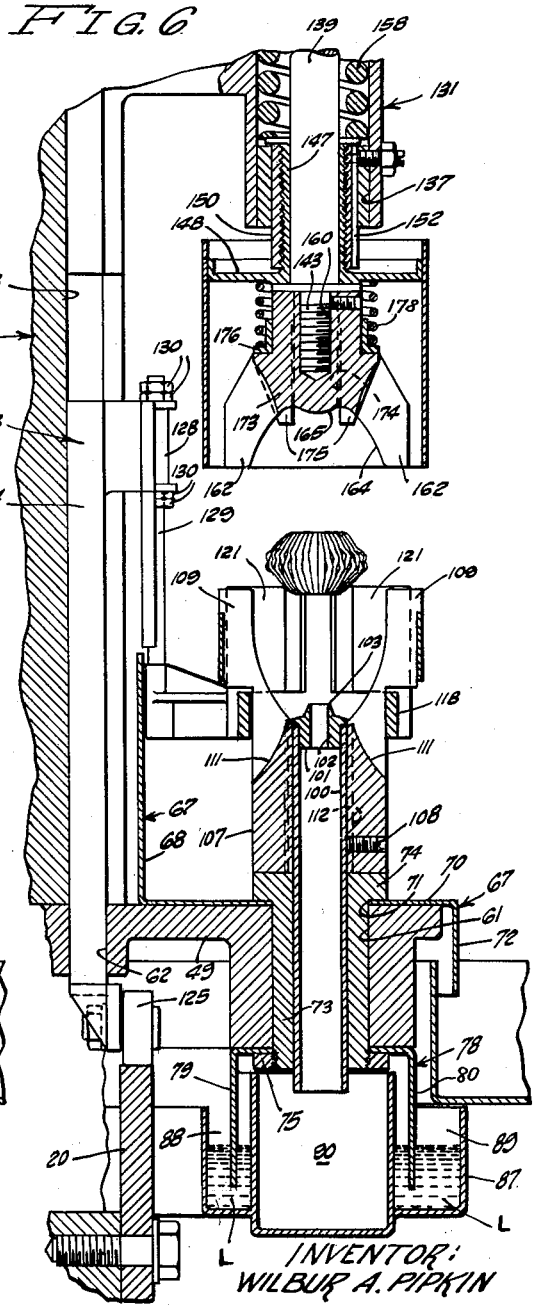
INVENTOR:
WILBUR A. PIPKIN
BY
ATTORNEY Feb. 6, 1951 W. A. PIPKIN 2,540,345
METHOD OF AND APPARATUS FOR EXTRACTING JUICE
FROM WHOLE CITRUS FRUIT AND EXCLUDING
ATMOSPHERE FROM CONTACT THEREWITH
Filed July 3, 1944 5 Sheets-Sheet 5
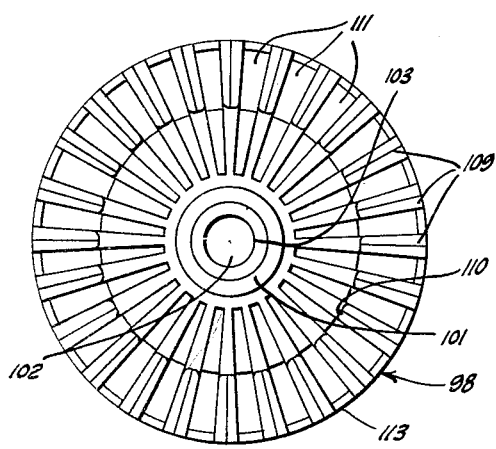
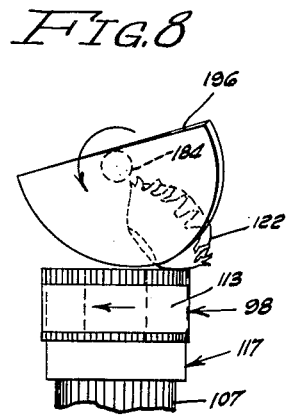
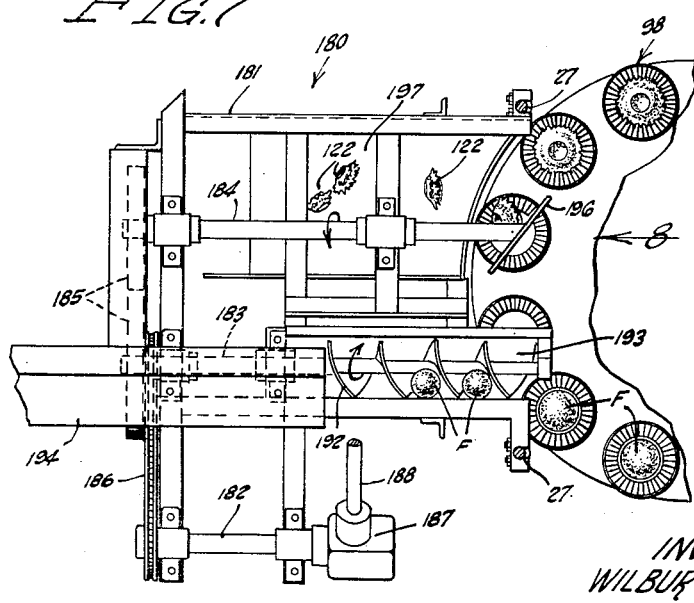
INVENTOR:
WILBUR A. PIPKIN
ATTORNEY Patented Feb. 6, 1951

2,540,345

UNITED STATES PATENT OFFICE 2,540,345

METHOD OF AND APPARATUS FOR EXTRACTING JUICE FROM WHOLE CITRUS FRUIT AND EXCLUDING ATMOSPHERE FROM CONTACT THEREWITH

Wilbur A. Pipkin, Safety Harbor, Fla.

Application July 3, 1944, Serial No. 543,395

5 Claims. (Cl. 99—105)

This invention relates to the extraction of juice from whole citrus fruit.

It is an object of this invention to provide a method of and apparatus for extracting juice from whole citrus fruit in which contamination of the juice by contact with air in the extraction process is prevented.

The manner of accomplishing the foregoing objects, as well as further objects and advantages, will be made manifest in the following description taken in connection with the accompanying drawings in which:

Fig. 3 is an enlarged fragmentary detailed view of an extraction mechanism of the invention and illustrating a means for sealing off the juice-receiving chamber from the atmosphere.

Fig. 4 is an enlarged horizontal sectional view taken on the line 4—4 of Fig. 2.

Fig. 5 is a fragmentary vertical sectional view taken in the same plane as Fig. 3 and showing a pair of cups of the apparatus in inter-digitating relation with a carcass of a citrus fruit confined between the cups as occurs at the moment a juice extraction operation is completed.

Fig. 6 is a view similar to Fig. 5 and showing said cups in separated relation as when the carcass of a citrus fruit is being ejected from the cups.

Fig. 7 is a diagrammatic plan view of the fruit feeding and carcass ejecting mechanism of the invention.

Fig. 8 is a diagrammatic, enlarged, elevational view of the carcass ejector of the invention and is taken in the direction of arrow 8 in Fig. 7.

Fig. 9 is an enlarged plan view of the lower cup of one of the juice extracting mechanisms of the invention.

Figure 1:
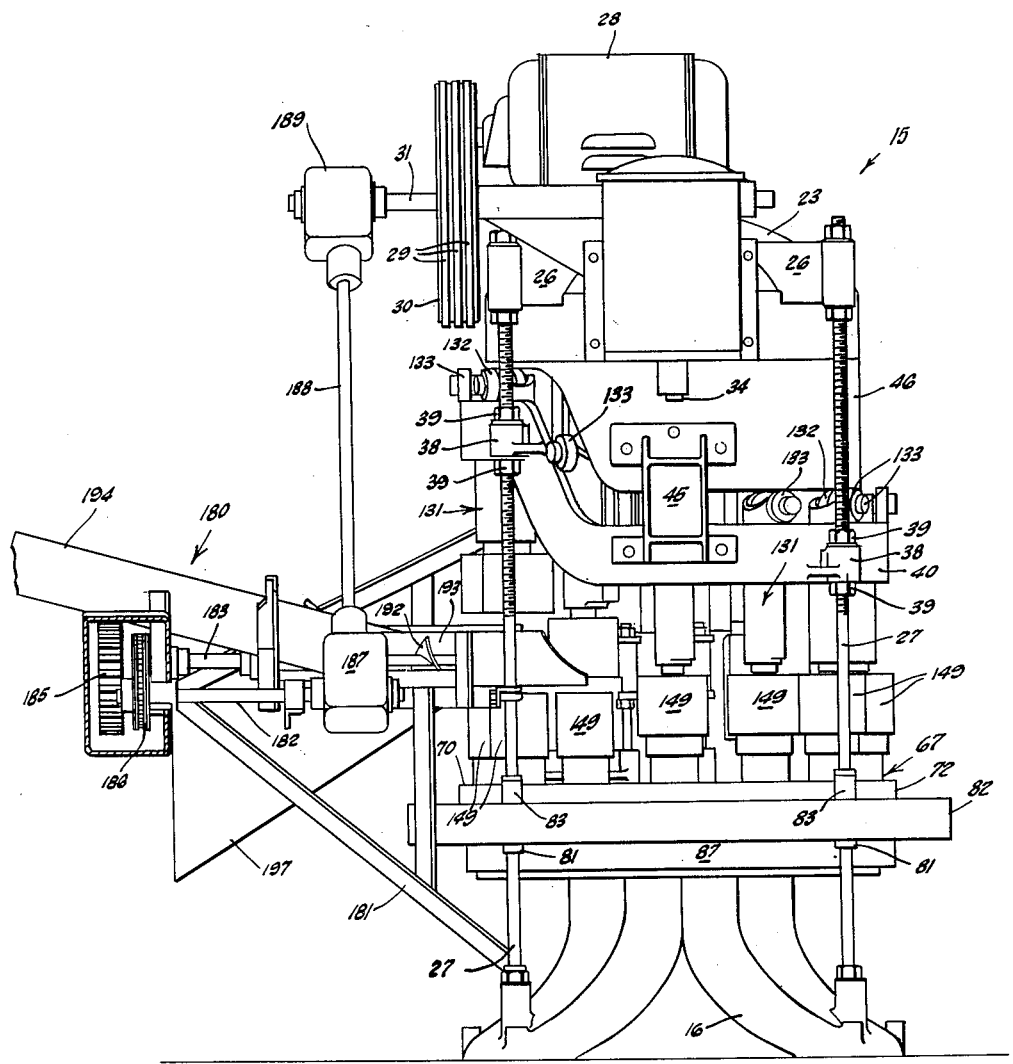
Fig. 1 is a side elevational view of a preferred embodiment of the apparatus of my invention.

Referring specifically to the drawings, the apparatus of this invention as shown therein, is embodied in a peel oil and juice extractor 15. This includes a pedestal 16, a central opening 17 of which receives a boss 18 of a cap plate 19 having a cam wall 20. Fixed in a central bore 21 of the boss 18 is a shaft 22 to the upper end of which is fixed a head casting 23. The head casting 23 has arms 26 which are connected by rods 27 to the pedestal 16 to rigidly unite and properly space the pedestal 16 from the head casting 23. The head casting supports a motor 28 which is connected through belts 29 and pulley 30 to a shaft 31 which through bevel-gears 32 and 33 rotates a shaft 34 carrying a master pinion 35.

Collars 38 surrounding the rods 27 and positioned vertically thereon by nuts 39 are formed integral with and support a lower annular cam 40. This cam is connected by brackets 45 to an upper cam 46 so that the upper cam is forced upwardly into assembled relation with the head casting 23. As shown in Fig. 1, the cam 46 is disposed inwardly and concentric with the cam 40. Resting on the plate 19 is a thrust bearing 47 which supports the rotor 48 of the machine. This rotor includes a rotor platform 49 which rests directly on the bearing 47, a slideway cylinder 50 having upper and lower hub-like sleeves 51 and 52, the latter extending into the bearing 47 and being keyed to the platform 49 by a key 53. Sleeves 51 and 52 have bushings 54 and 55 which form bearings on the shaft 22. Mounted about the upper sleeve 51 and keyed thereto is a master gear 56 which meshes with the pinion 35.

Figure 2:
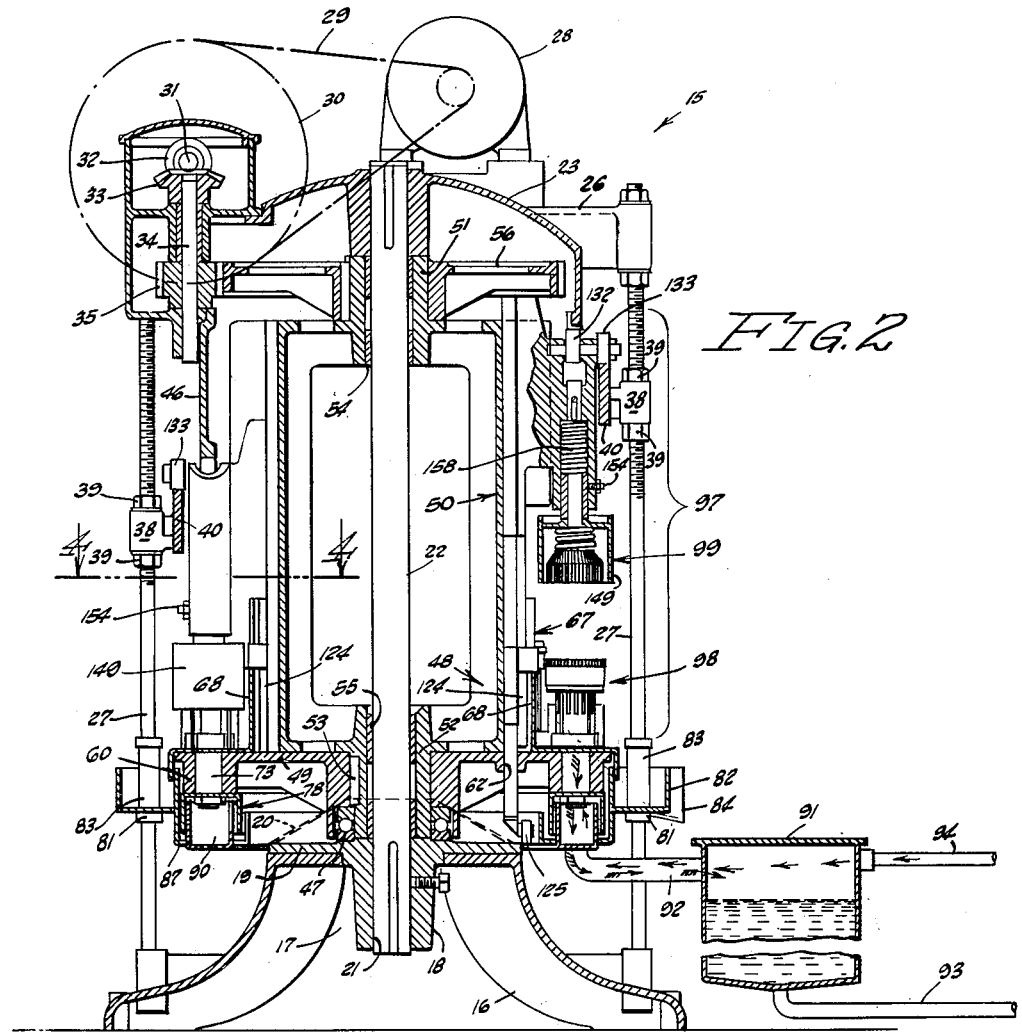
Fig. 2 is a vertical sectional view taken through the axis of the machine shown in Fig. 1.

The rotor platform 49 has an annular downward extension 60 near its outer edge which is provided with a series of twelve bores 61. Ejector stem guide holes 62 are provided in the platform, one of these being disposed close to each of the bores 61 and inwardly therefrom as shown in Figs. 2 and 3.

The holes 62 are formed in downward extension of and in alignment with slideways 63 provided in the cylinder 50. These slideways are given a T cross section by slide gibs 64 secured to the outer face of the cylinder 50, these gibs having outward extensions 65 formed on upper portions thereof.

The platform 49 is provided with a stainless steel apron 67, having a cylindrical portion 68, which closely surrounds the lower portion of the cylinder 50 and is provided with slots 69 which register with the adjacent lower portions of the slideways 63. The apron 67 also includes a horizontal portion 70 which lies flat against the platform 49 and has holes 71 which register with the bores 61. Depending from the outer edge of the apron portion 70 is an annular lip 72.

Each of the bores 61 receives a sleeve 73 having an upper flange 74 and threadedly receiving a nut 75 at its lower end to secure this sleeve in said bore and thus hold the apron 67 rigidly in place on the platform 49. A sheet metal annulus 78 is provided, this having an inverted U cross section to provide downwardly extending walls 79 and 80, and holes which receive the lower ends of the sleeves 73 so that when the nuts 75 are tightened on the latter, the annulus 78 is united with the platform extension 60.

Supported on collars 81 on the rods 27 is an annular oil collecting trough 82 having sleeves 83, which surround the rods 27, and a discharge spout 84. Supported on the trough 82, or in any suitable manner, is an annular juice-receiving trough 87, having concentrically united therewith troughs 88 and 89 into which the walls 79 and 80 extend downwardly. A liquid L is provided in these troughs to form liquid traps which maintain an air tight seal excluding air from the juice-receiving chamber 90 within the trough 87.

Leading from the chamber 90 to a juice reservoir 91 is a tube 92. Also connecting with the reservoir 91 is a juice eduction pipe 93 and a gas supply pipe 94.

Mounted about the rotor 48 is a series of extracting mechanisms 97, each of which includes a lower cup 98 and an upper cup 99, with suitable means for mounting and operating these. As all of the mechanisms 97 are identical, a description of one will suffice for all.

Illustrations of a lower cup 98 may be found in Figs. 3, 5 and 6. This cup includes a stainless steel tube 100 which has a driven fit in one of the sleeves 73 so as to permanently fix the tube 73 in this sleeve. Mounted in the upper end of the tube 100 (see Figs. 5 and 6) is a button cutter 101 having a central passage 102, an annular knife 103 surrounding the upper end of this, and a sloping shoulder 104 which rests upon the upper end of the tube 100.

Surrounding the tube 100 where this extends above the sleeve 73 is a cylindrical cup body 107 having a set screw 108 which fixes this to the tube 100. Formed integral with the cup body 107 is a series of fingers 109 which are circumferentially arranged in radial relation with the axis of the cup to form a cup bowl 110 at the bottom of which is located the button cutter 101. The fingers 109 are separated by slots 111 which are slightly wider than the fingers themselves. Certain of the slots 111 are extended downwardly to form ejector slots 112. There are preferably twenty-four fingers 109 and slots 111 in each cup 98 and six of the ejector slots 112.

The fingers 109 may be reinforced as by an annular band 113 encircling the upper portion of the cup 98. The upper ends of the fingers 109 may be beveled for a purpose to be made clear hereinafter. Fingers 109 preferably have notches 114 provided therein to extend the cylindrical character of the body 107 upwardly as shown in Fig. 6.

Each cup 98 has an ejector 117. This ejector includes a base ring 118 on which is fixed an actuating arm 119 having a long eye 120 at its outer end. The base ring 118 also has formed thereon a series of ejector blades 121, each of which lies in one of the ejector slots 112. Each ejector 117 is adapted to rest in a downward position in which it is shown in Fig. 5 or to be elevated into an upper position in which it is shown in Fig. 6. When lifted to the latter position, the blades 121 extend upwardly through the bowl 110 of the cup 98 to lift a carcass 122 of an orange upwardly out of this bowl.

Vertically slideable in a lower portion of the slideway 63 adjacent each of the cups 98 is a T-head 123 having a shank 124 which extends downwardly through the slideway 63 and hole 62 in alignment therewith, this shank having a roller 125 mounted on its lower end so that this roller is in vertical alignment with the cam wall 20. The T-head 123 has a long eye 128 formed integral therewith, there being a rod 129 which screws into suitable threads provided in the eye 120 and also extends through the eye 128 and is secured in a given vertical relation therewith by nuts 130.

The cam 20 lifts each roller 125 as the rotor 48 rotates to shift the ejector 117 associated therewith from its lowermost position as shown in Fig. 5 to its uppermost position as shown in Fig. 6 and back again to its lowermost position. The period wherein this takes place will be pointed out hereinafter. When each of the T-heads 123 thus reciprocates, it extends through one of the slots 69 in the cylindrical portion 68 of the apron 67. (See Figs. 2 and 3.)

Illustrations of the upper cup 99 may be found in Figs. 2, 5 and 6. Each of these cups is mounted on a T-head 131 sliding in an upper portion of one of the slideways 63. This T-head has a pair of cam follower rollers 132 and 133, the first of these following upper cam 46 and the other following lower cam 40. (See Fig. 1.)

The T-head 131 has a bore 134 which is disposed in alignment with the roller 132 and which has a counterbore 137, at the upper end of which, is a shoulder 138. Slideable in the bore 134 is a cup stem 139 in the form of a shaft having an eye slot 140 disposed mainly in said bore, there being a pin 141 mounted in the head 131 and extending through said slot to permit a limited degree of vertical movement of the stem 139 relative to the head 131.

The lower end of the stem 139 (see Fig. 3) has an annular flange 142 and a threaded nipple 143 extending axially downward therefrom. Surrounding the stem 139 and resting downwardly on the flange 142 is a tube 147 having a housing head plate 148 flaring outwardly therefrom and carrying a cylindrical housing shell 149. The tube 147 is externally threaded and has screwed thereon a bushing 150 having a longitudinal groove 152 cut therein. Secured in the lower end of bore 137 so as to slideably receive the bushing 150 is a bushing 151. Screwed into a threaded hole 153, formed in the wall of the bore 137 and in the bushing 151, is a screw 154 having a guide tit 155 provided on its inner extremity, this tit extending into the guide groove 151 of the bushing 150. Trapped in the counterbore 137 between the upper end of the bushing 150 and the shoulder 138 is a heavy coiled expansive spring 158.

The upper cup 99 (see Figs. 5 and 6) also includes a cup body 159 having a threaded bore 160 into which the nipple 143 screws to assemble the body 159 on the stem 139. The body is held in this assembled relation by a set screw 161. The body 159 has a series of fingers 162 formed integrally therewith and spaced circumferentially in radial planes with respect to the axis of the cup 99. The inner surfaces of the fingers 162 are shaped to form an inverted bowl 164, the bottom 165 of which may be concave, or flat, or it may be convex as shown in Figs. 5 and 6. I have found it preferable, however, to make this convex, as shown, for reasons that will be pointed out hereinafter. The fingers 162 are separated by slots 173 which are slightly wider than the fingers.

Certain of the slots 173 are deepened to form slots 174 in which ejector blades 175 are slideably disposed. These blades are united by a collar 176 which is slideably mounted on the body 159 and is pressed against a shoulder 177 thereof by an expansion spring 178. When the collar 176 is thus yieldably held downward, the ejector blades 175 extend downwardly into the upper cup bowl 164 as shown in Fig. 6.

In each of the mechanisms 97 the upper and lower cups 99 and 98 are co-axial and the upper cup body 159 is so mounted on the stem 139 that the slots 173 of the upper cup are in alignment with the fingers 109 of the lower cup while the fingers 162 of the upper cup are in alignment with the slots 111 of the lower cup. The fingers of the upper and lower cups thus by-pass each other in inter-digitating relation when the upper cup 99 is lowered as shown in Fig. 5.

The juice extractor 15 has a whole fruit feed and carcass removing mechanism 180 (see Figs. 1 and 7) which includes a frame 181 provided with suitable bearings in which shafts 182, 183 and 184 are journalled. The shafts 183 and 184 have meshing gears 185 which cause these shafts to rotate in opposite directions as indicated by the arrows on these shafts in Fig. 7. Shafts 182 and 183 have a chain and sprocket connection 186 and the shaft 182 is connected, through gears 187, a shaft 188 and gears 189, to the shaft 131 whereby the mechanism 180 is driven from the motor 28.

The shaft 183 extends toward the machine 15 and into the space separating the upper and lower cups of the extracting mechanisms 97 when the upper cup 99 is elevated as shown in Fig. 6. This shaft is provided with a feed screw 192 and this screw is surrounded by a sheet metal trough 193 into which fruit is fed by gravity through a chute 194 and which guides fruit propelled by the screw 192, as the latter rotates with the shaft 183, until this fruit is discharged from trough 193 and allowed to fall downwardly into one of the lower cups 98.

The inner end of the shaft 184 extends to a point intercepting the axes of the extracting mechanisms 97 as the latter rotate with the rotor 48. Mounted obliquely on the inner end of the shaft 184 is a substantially semi-circular carcass removing blade 196 (see Figs. 7 and 8) which is rotated by the shaft in such timed relation with the rotation of the rotor 48 as to engage each carcass 122 as it travels supported on the ejector blades 121 (see Fig. 6) and throws this outwardly from the machine so that it drops in a chute 197 provided to receive this.

Operation

Before commencing juice extracting operations with the machine 15, the pipe 94 is provided with a continuous supply of inert gas such as carbon dioxide or nitrogen, both of which are quite cheap and either of which serves the purposes of the invention quite satisfactorily. This gas flows into reservoir 91, pipe 92 and into the chamber 90, drives the atmosphere from all these, and completely fills them with gas. This gas then starts escaping upwardly from the tubes 100 in the lower cups 98. It is to be understood also that I may employ live steam in lieu of gas thereby not only excluding the atmosphere from chamber 90 but also starting a pasteurizing of the juice. Where used in the claims, the term "gas" may be construed broadly therefore as including steam.

A supply of fresh whole fruit such as oranges F is now fed to the machine through the chute 194. The motor 28 being energized, the rotor 48 is rotated by the pinion 35 engaging the master gear 56, this being preferably at about 25 R. P. M. The fruit feeding and carcass removing mechanism 180 is, of course, driven in timed relation with the rotor 48 so that the whole fruit received through the chute 194 is fed one piece at a time into the lower cups 98 as these come underneath the discharge end of feed trough 193.

When the lower cup of each extraction mechanism 97 thus receives a fresh whole fruit F, the upper cup thereof is in elevated position due to the roller 133 thereof riding on a high point in the lower cam 40. At this time, the roller 125 of this extraction mechanism has rolled downwardly onto the lower portion of the cam 20 (see Fig. 3) so that the ejector 117 is disposed in lower position as shown in Fig. 5. The bowl 110 of the lower cup 98 is thus unobstructed and readily receives the fruit. Almost immediately thereafter, the roller 132 of this mechanism is forced downwardly by engagement with the upper cam 46 to cause the upper cup 99 to move downwardly into inter-digitating relation with the lower cup 98 so that the piece of fruit F therein is surrounded by the fingers of the two cups and compressed by a continuous reduction in the space in the combined bowls 110 and 164 of the two cups.

As the cups come together on this piece of fruit, the pressure between the fruit and the blades 175 in the upper cup prevent further downward movement of these blades with the upper cup, so that these blades are retracted relative to the upper cup and the spring 178 compressed as shown in Fig. 5. The initial compression of the fruit between the cups also impales the fruit on the annular knife 103 so as to cut a button from the rind of the fruit which is forced through the hole 102 of the knife element 101 (see Fig. 5) as the increase of pressure against the outer surface of the fruit breaks down the inner juice structure and compels the juice therein to escape outwardly through the passage 102.

The trapping of a fresh whole fruit in this manner between the upper and lower cups of an extraction mechanism 97 applies pressure to all portions of the fruit outside the area from which a button is cut by the knife 103 in such a uniform manner that the juice-bearing structure is unable to burst through the rind and practically all the juice from this is therefore expelled through the opening through the rind made by the knife 103.

Owing to the fact that the annular juice-receiving chamber 90 and tubes 100 are completely filled with inert gas, the juice thus extracted from the fruit and expelled downwardly therefrom through the passages 102 in the tubes 100 is protected from contact with the atmosphere.

Fig. 5 illustrates how the convex bottom face 165 of the cup 99 depresses a portion of the rind of the orange being compressed so as to substantially decrease the space remaining within the rind of the fruit and thereby obtain a greater degree of compression of the fruit with a given movement together of the cups 98 and 99. This makes it possible to secure the desired compression of the orange without too great a scolloping effect on the rind in the plane where the fingers of the respective cups enter inter-digitating relation. This scolloping effect on the rind carcass produced in the extracting operation is indicated in Fig. 6. While this constitutes a laceration of the rind, it does not extend to rupturing the outer envelope of the juice-bearing structure. The latter is thus kept intact and prevented from bursting outwardly through the rind during the compression of the fruit between the cups.

The pressure of the cups on the rind of the fruit in the juice extracting operation ruptures the oil cells and releases the peel oil causing it to spurt outwardly against the fingers of the two cups and the housing 149, the oil then draining from these onto the stainless steel apron 67 from which it flows over the lip 72 into the annular trough 82. The peel oil is thus extracted from the whole fresh fruit and recovered separately from the juice.

As the rotor 48 continues to turn following the completion of the compression step of the process, the roller 133 of each successive mechanism 97 rides upwardly on the lower cam 40 so as to lift the upper cup 99 of this mechanism to its maximum height. At this time, the ejector roller 125 of this mechanism comes opposite the rise in cam 20 which lifts the carcass ejector 117 and the carcass 122 as shown in Fig. 6. Immediately following the elevation of the carcass 122, this extraction mechanism 97 comes opposite the carcass removing blade 196 which is so timed as to swing downwardly and obliquely against this carcass as it comes directly beneath the shaft 184 thereby sweeping this carcass into the chute 197. Immediately following this action, the ejector 117 of this cup is lowered and the cup swings into position under the discharge end of the fruit feeding trough 193 where it receives another whole piece of fruit.

From the foregoing description, it will be seen that I have devised a machine for separately extracting and recovering peel oil and juice from whole citrus fruit which has a relatively high capacity. It is also evident that the juice extracted by this machine in accordance with the method of my invention is protected from contact with the atmosphere so as to eliminate deterioration of the juice from this source.

The upper and lower cups are spaced vertically so as to effectively extract the juice from the smaller sizes of fruit fed to the machine. When a larger piece of fruit is received by a mechanism 97, the spring 158 thereof yields to adapt the cups 98 and 99 to the larger bulk of rind and pulp present in the larger piece of fruit.

I claim:

1. A method of expressing juice from whole citrus fruit which consists in: enclosing a juice-receiving chamber, having an opening therein, forming a hole in the rind of said fruit, accomplishing a sealed communication between said hole and said opening while said fruit is exposed to the atmosphere, filling said chamber with an inert gas, and constricting said fruit to reduce the volume thereof and express a relatively large portion of the juice therein outwardly through said hole and said opening into said chamber by continuously applying compressive forces to all portions of the rind of said fruit outside the area of said hole at points sufficiently close to prevent the juice-bearing structure within said fruit bursting outwardly through said rind elsewhere than through said hole.

2. A continuous method of extracting juice from a series of whole citrus fruits which comprises: enclosing a juice-receiving chamber, having a relatively small opening therein, discharging a stream of inert gas into said chamber to cause said gas to fill said chamber and then escape through said opening and successively pressing said citrus fruits against said opening to close the same, forming a hole in the rind of each fruit closing said opening which hole communicates with said opening, constricting each fruit when so pressed to force juice from said fruit through said hole and said opening into said chamber, and removing the carcass of each such whole fruit from closing relation with said opening after said constricting step to permit the application of the next whole citrus fruit of said series to said opening.

3. In an apparatus for extracting juice from whole citrus fruit, the combination of: a pair of support means adapted for pressurally contacting opposite hemispheres of said fruit to cause said hemispheres to closely conform respectively to said support means and thereby adequately support the rind of said fruit against local outward bursting of said fruit; a structure for holding said support means in relatively movable relation, means located within one of said support means and adapted to form a hole in said rind when said fruit is pressed thereagainst; means for applying said support means to said fruit to press said fruit against said hole-forming means to form a hole in said rind, and for pressing said support means against opposite hemispheres of said fruit to cause said support means to support said rind as aforesaid and, while maintaining said support, to reduce the volume of the space occupied by said fruit between said support means and thus expel juice therefrom through said hole; means forming a juice passage communicating with said hole-forming means whereby juice expelled from said fruit through said hole is delivered into said passage; and means discharging inert gas into said juice passage to produce a superatmospheric pressure of said gas therein whereby said gas fills said passage, excludes the atmosphere from said juice, and flows outwardly into the atmosphere through said hole-forming means whenever the latter is not covered as by a piece of fruit.

4. In an apparatus for extracting juice from whole citrus fruit, the combination of: a rotor; a series of juice extracting units circumferentially provided on said rotor, each of said units comprising a combination as recited in claim 3; means for rotating said rotor; means responsive to said rotation for reciprocating one of the support means of each of said units relative to the other support means thereof to cause each of said units to form a hole in a citrus fruit contained therein and expel juice therefrom through said hole as aforesaid; means for feeding whole fruit to said units as said rotor is rotated; and an annular trough which communicates with the juice passages of all of said units, said inert gas means delivering gas to said juice passages through said annular trough.

5. A combination as in claim 4 in which said annular trough includes a stationary bottom portion with inner and outer side walls; an annular cover mounted on said rotor and having said individual juice passages formed therein and communicating upwardly with the respective hole-forming means of said units; and means forming a sealing connection between said side walls of said trough and said cover means so as to close the space within said annular trough from the atmosphere.

WILBUR A. PIPKIN.

REFERENCES CITED

The following references are of record in the file of this patent:

UNITED STATES PATENTS

| Number | Name | Date |
| --- | --- | --- |
| 1,925,196 | Maull | Sept. 5, 1933 |
| 1,960,501 | Maull | May 29, 1934 |
| 2,270,007 | McKinnis | Jan. 13, 1942 |
| 2,289,445 | McKinnis | July 14, 1942 |
| 2,332,177 | Smith | Oct. 19, 1943 |
| 2,337,261 | McKinnis | Dec. 21, 1943 |
| 2,346,561 | Delay | Apr. 11, 1944 |
| 2,353,841 | McKinnis | July 18, 1944 |